Patented Aug. 19, 1947

2,426,087

UNITED STATES PATENT OFFICE 2,426,087

CONVERSION OF HYDROSULFIDES TO NEUTRAL SULFUR SUBSTANCES

Lloyd C. Fetterly, Long Beach, Calif., assignor to Shell Development Company, San Francisco, Calif., a corporation of Delaware No Drawing. Application June 26, 1944, Serial No. 542,256

10 Claims. (Cl. 23—184)

This invention relates to the oxidation of sulfhydryls or hydrosulfides, i. e., H₂S and mercaptans including both aliphatic mercaptans and thiophenols, to neutral sulfur substances, i. e., free sulfur and organic disulfides. More particularly, it deals with employing certain nitro amino or nitro hydroxy benzenes as catalysts for this oxidation.

The oxidation of hydrosulfides has particular application in the regeneration of alkaline solutions employed for treating sour hydrocarbons whereby hydrosulfides are extracted by the alkaline solution and then are oxidized (such as by air blowing) to form neutral sulfur substances. These neutral substances are then removed so that the alkaline solution may be used again to extract more hydrosulfides from more sour hydrocarbon distillates.

It is a purpose of this invention to simply, efficiently, and economically oxidize hydrosulfides to neutral sulfur substances. Another purpose is to simply, efficiently and economically regenerate by oxidation alkaline solutions employed in treating sour hydrocarbon distillates. Still another purpose is to speed up such oxidation reactions with a small amount of an active and stable oxidation catalyst. Further incidental purposes are: to increase the lead susceptibility of gasoline treated with alkaline solutions regenerated by the process of this invention; to lower the mercaptan sulfur content of gasolines so treated; to increase the solubility of mercaptans in such alkaline treating solutions; etc.

Generally speaking, the process of this invention comprises carrying out the oxidation of hydrosulfides to neutral sulfur substances in the presence of a small amount of an oxidation catalyst comprising a nitro diamino-, nitro dihydroxy- or nitro amino-hydroxy benzene, such as picramic acid.

A specific embodiment of the process may comprise the steps of (1) extracting hydrogen sulfide and/or mercaptans from hydrocarbon mixtures containing them with an aqueous alkaline solution, which may or may not contain a solutizer (solubility promoter) for said hydrogen sulfide and mercaptans; (2) separating the resulting aqueous alkaline solution phase containing dissolved hydrosulfides; (3) treating it with an oxidizing agent in the presence of one of said above-mentioned nitro benzene catalysts to precipitate neutral sulfur substances, such as free sulfur and/or organic disulfides; (4) removing these precipitated neutral sulfur compounds; and (5) recycling the resulting regenerated aqueous alkaline solution for extracting more hydrosulfides from more hydrocarbons.

Hydrosulfides may be derived from any natural or synthetic source. Thus, petroleum or coal tar fluids, such as natural or coke oven gases, natural gasolines, gasolines, kerosene, etc., both straight run and cracked, usually contain hydrogen sulfide and/or mercaptans.

The oxidation of hydrosulfides is carried out in an alkaline solution and therefore at least part of the hydrosulfides are in the form of their metal sulfides or mercaptides.

Various alkaline treating solutions may be employed. If hydrogen sulfide is to be oxidized, the alkaline treating solution may comprise alkali or alkali earth metal hydroxides, phosphates, carbonates, phenolates, borates, arsenates, organic amines such as alkanol amines or alkylene diamines, piperidine, piperazine, diazine, pyridines, quinolines, picolines, etc. If mercaptans are to be oxidized, the alkaline treating solution may comprise aqueous alkali metal hydroxide solutions which may or may not contain solutizers for mercaptans.

Solutizers promote the solubility of the hydrosulfides in aqueous alkaline solutions. Some suitable solutizers are lower alkyl mono and poly hydroxides, lower aliphatic polyamines, alkanol amines, hydroxy or amino ethers, fatty acids of 2 to 6 carbon atoms, naphthenes and carboxylic acids of 5 to 11 carbon atoms, phenols containing up to 15 carbon atoms, etc. The preferred solutizers are phenols and fatty acids containing from 3 to 5 carbon atoms.

Oxidizing agents suitable for converting hydrosulfides to neutral sulfur materials include peroxides, permanganates, manganese dioxide, hypochlorides, oxygen, air (preferably free of carbon dioxide), etc. Air blowing at temperatures between about 60° F. and 200° F., and preferably not above 150° F., has been found to be a satisfactory method for oxidizing hydrosulfides. The pressure is usually atmospheric, but higher or lower pressures may also be employed, if desired.

Neutral sulfur substances formed by oxidation include free sulfur (oxidized from hydrogen sulfides) and organic disulfides (oxidized from mercaptans and mercaptides) forming solid or liquid precipitates in aqueous alkaline solutions. These precipitates are easily removed by decantation, settling or filtering. The rate of settling of the sulfur materials in aqueous spent alkaline solutions may be increased by dilution. In certain alkaline solutions (such as solutizer solutions) having a high content of organic constituents, organic disulfides may be fairly soluble and may have to be extracted with suitable solvents, such as hydrocarbon liquids.

The particular oxidation catalysts of this invention are nitro benzenes that contain, preferably on the same benzene ring, in addition to the nitro radical, at least two radicals, preferably ortho or para to each other, selected from the group consisting of amino and hydroxy radicals. Other radicals may also be substituted on the benzene ring, such as alkyl, alicyclic, aryl (condensed or otherwise), halogen, carboxyl, and further hydroxy, amino and/or nitro radicals. One hydrogen atom on any one or more of the amino radicals may be substituted with a hydrocarbon or acyl radical.

These catalysts, in general, become more resistant toward being themselves oxidized as more vacant positions on their benzene rings are filled with stabilizing groups. The addition of further hydroxy and amino radicals increases the activity of the catalyst but frequently reduces its stability. On the other hand, the addition of carboxyl, nitro, sulfonyl, phosphenyl, etc., radicals increases the stability of the catalyst. Polar radicals, in general, increase the solubility of the catalyst in alkaline solutions, while hydrocarbon radicals usually decrease their solubility. Preferably, the catalyst should be more soluble in alkaline solutions than in hydrocarbons.

Some suitable catalysts are 3-nitro-pyrocatechol, 4-nitro-pyrocatechol, nitro pyrogallols, nitro bromo pyrogallols, nitro chloro hydroquinones, 2-amino-3-nitro-phenol, 2-amino-4-nitro-phenol, 2-amino-5-nitro-phenol, 2-amino-6-nitro-phenol, 4-amino-2-nitro-phenol, 4-amino-3-nitro-phenol, 4-nitro-o-phenylene-diamine, 2-nitro-p-phenylene-diamine, 2-amino-4,6-dinitro-phenol, 5-nitro-3-amino-salicylic acid, 2-amino-4-nitro-naphthol, nitro naphthazarin, nitro anthrahydroquinone, etc.

The amount of catalyst employed may vary between about .1% and 5% by weight (and preferably between .5% and 3% by weight) of the solution to be oxidized containing the hydrosulfides. Within the above limits greater amounts of catalyst produce faster oxidation of the hydrosulfides for any given solution. It is usually desired to control the oxidation of the hydrosulfides present in the solution so that between about .1% and 1% by weight of hydrosulfides will remain unoxidized in order to insure against the oxidation of the catalyst. Either mercaptans or hydrogen sulfide, or both, may be used for the protection of the catalyst.

In order that catalysts of this nature be highly effective, it is necessary that they contain one amino and in addition at least one other amino or hydroxy radical. However, the presence of two or more of these radicals attached to the aromatic nucleus causes the catalyst to become very susceptible to deterioration by oxidation. The presence of one or several nitro radicals attached to the nucleus stabilizes the catalyst, that is, it makes it less susceptible to deterioration by oxidation without materially reducing its catalytic activity.

If the catalyst itself is only mildly oxidized in the process, the corresponding quinone or imino analogue formed thereby is easily reduced to its original form by hydrosulfides. Therefore, as long as there is a substantial amount of mercaptan sulfur or inorganic sulfide sulfur in the aqueous treating solution, the bulk of the catalyst will not be permanently oxidized. However, when the content of this type of sulfur drops very low the catalyst begins to oxidize beyond the quinone and imide stage. To prevent this, a protective amount of this type of sulfur should be left in the treating solution, the minimum protective amount varying with the nature of the catalyst. A catalyst which is easily oxidized requires a relatively large amount of this type of sulfur while a more stable catalyst is effectively protected with a smaller amount. The catalysts of this invention require in general not more than about .1% to .2% mercaptan sulfur to protect them.

Residual mercaptan sulfur in the regenerated treating solution controls its so-called re-entry value, that is the amount of mercaptan that is introduced into a hydrocarbon distillate by contacting it with the regenerated treating solution. If the re-entry value is too high the hydrocarbon distillate cannot be sweetened by extraction with regenerated solution. Hence, it is important that the residual mercaptan sulfur content and its consequent re-entry value be as low as possible.

The relatively high stability of the catalysts of this invention makes possible a very low re-entry value.

The following specific examples illustrate this invention:

Example I

A 1000 ml. sample of a spent alkaline solution containing 2.5% by weight of NaOH, about .04% by weight of picramic acid, and mercaptans (extracted from a 200° F. end point gasoline) was alternately blown with air at 70° F. in a fritted gas bubbler and respent with more mercaptans from more of the same gasoline. After each extraction and each oxidation the per cent by weight of mercaptan sulfur in the sample was determined.

| Number of Previous Treatments | Treatment | Per cent by weight Mercaptan Sulfur |
|---|---|---|
| 0 | Spent with RSH | .32 |
|   | Air blown 2 hrs. | .000 |
| 2 | Respent with RSH | 1.53 |
|   | Air blown 6 hrs. | .000 |
| 8 | Respent with RSH | 1.72 |
|   | Air blown 12 hrs. | .000 |

The accumulated time of blowing was 78 hrs. and the number of times zero mercaptan content was obtained was 4. At the end of this period the catalyst was still active, the sodium sulfide content having protected the catalyst from being oxidized.

Example II

A sodium hydroxide solution that was spent in treating gasoline and that contained .67% by weight of sodium hydroxide, .60% by weight of sulfide sulfur, and .77% by weight of mercaptan sulfur, was admixed with .1% by weight of picramic acid and air blown at 70° F. for two hours. The resulting blown solution contained 1.65% by weight of sodium hydroxide, .54% by weight of sulfide sulfur, and .000% by weight of mercaptan sulfur. The increase in NaOH content is due to the removal of sodium mercaptides to disulfides and free caustic.

There are many advantages attained by using catalysts of the type disclosed herein for the regeneration of the described spent alkaline treating solutions. Some of these advantages include high activity, and high stability of the catalyst which, in turn, produces efficient oxidation of the hydrosulfides at relatively low temperatures, thus reducing the amount of heat required, if any, and reducing the amount of corrosion of the apparatus. Since the process is simple, efficient and easily carried out, the capital cost of the apparatus and the amount of chemicals needed to run it are comparatively low. Another advantage is that the described catalysts themselves are solutizers for mercaptans.

The invention claimed is:

1. In a process for regenerating spent aqueous alkaline solutions containing hydrosulfides extracted from sour hydrocarbons, the improvement comprising contacting said spent solution with an oxygen-containing oxidizing agent for said hydrosulfides in the presence of a small amount of a nitrobenzene oxidation catalyst containing attached to the benzene nucleus two polar groups selected from the class of groups consisting of amino and hydroxy groups, and mixtures thereof.

2. The process of claim 1 wherein said hydrosulfides comprise hydrogen sulfide.

3. The process of claim 1 wherein said hydrosulfides comprise mercaptans.

4. The process of claim 1 wherein said oxidizing agent is an oxygen-containing gas.

5. The process of claim 1 wherein said oxidizing agent is air.

6. The process of claim 1 wherein said alkaline solution is an aqueous solution of an alkali metal compound and said catalyst is dissolved therein.

7. The process of claim 1 wherein the amount of said catalyst is between .1% and 5% by weight of said solution.

8. The process of claim 1 wherein the amount of said catalyst is between .5% and 3% by weight of said solution.

9. In a process for regenerating spent aqueous alkaline solutions containing hydrosulfides extracted from sour hydrocarbons, the improvement comprising contacting said spent solution with an oxygen-containing oxidizing agent for said hydrosulfides in the presence of a small amount of picramic acid as oxidation catalyst.

10. In a process for regenerating spent aqueous alkaline solutions containing mercaptans extracted from sour hydrocarbons, the improvement comprising contacting said spent solutions with an oxygen-containing gas in the presence of a small amount of picramic acid as oxidation catalyst.

LLOYD C. FETTERLY.

REFERENCES CITED

The following references are of record in the file of this patent:

UNITED STATES PATENTS

| Number | Name | Date |
|---|---|---|
| 1,998,863 | Chaney et al. | Apr. 23, 1935 |
| 2,315,530 | Loyd | Apr. 6, 1943 |
| 2,316,092 | Loyd | Apr. 6, 1943 |
| 2,001,715 | Fischer | May 21, 1935 |
| 2,080,654 | Craig | May 18, 1937 |
| 1,943,744 | Rosenstein | Jan. 16, 1934 |
| 2,152,721 | Yabroff | Apr. 4, 1939 |
| 2,369,771 | Bond | Feb. 20, 1945 |